(12) United States Patent
Pellerey et al.

(10) Patent No.: US 11,685,457 B2
(45) Date of Patent: Jun. 27, 2023

(54) MOTOR CONTROL SYSTEMS AND METHODS FOR MICROMOBILITY TRANSIT VEHICLES

(71) Applicant: Lyft, Inc., San Francisco, CA (US)

(72) Inventors: Pierre Pellerey, San Francisco, CA (US); Nikola Popov, Burlingame, CA (US); Scott McDaid, San Francisco, CA (US); Adam Christopher Bender, Mountain View, CA (US)

(73) Assignee: Lyft, Inc., San Francisco, CA (US)

( * ) Notice: Subject to any disclaimer, the term of this patent is extended or adjusted under 35 U.S.C. 154(b) by 356 days.

(21) Appl. No.: 17/130,808

(22) Filed: Dec. 22, 2020

(65) Prior Publication Data

US 2022/0194504 A1    Jun. 23, 2022

(51) Int. Cl.
| | | |
|---|---|---|
| *B62H 5/18* | (2006.01) | |
| *B60L 50/60* | (2019.01) | |
| *B60L 7/10* | (2006.01) | |
| *G05D 1/00* | (2006.01) | |
| *B62J 43/10* | (2020.01) | |
| *B62J 43/30* | (2020.01) | |

(Continued)

(52) U.S. Cl.
CPC ................. *B62H 5/18* (2013.01); *B60L 7/10* (2013.01); *B60L 50/60* (2019.02); *B62J 43/10* (2020.02); *B62J 43/30* (2020.02); *B62J 45/20* (2020.02); *B62L 1/00* (2013.01); *B62M 6/45* (2013.01); *B62M 6/90* (2013.01); *G05D 1/0011* (2013.01); *H02K 7/006* (2013.01); *H02K 11/0094* (2013.01); *H02K 11/33* (2016.01); *H02K 21/22* (2013.01); *H02P 3/14* (2013.01); *B60L 2200/24* (2013.01)

(58) Field of Classification Search
CPC .... H02P 3/22; B62H 5/14; B62H 5/18; B60L 2200/24; B60L 2200/12; B60L 2270/36
See application file for complete search history.

(56) References Cited

U.S. PATENT DOCUMENTS

| | | |
|---|---|---|
| 7,368,889 B2 | 5/2008 | Youm |
| 9,573,569 B2 | 2/2017 | Hosaka |

(Continued)

FOREIGN PATENT DOCUMENTS

| | | |
|---|---|---|
| KR | 20200026493 A | 3/2020 |
| KR | 20200105021 A | 9/2020 |
| WO | WO 2017217936 A1 | 12/2017 |

OTHER PUBLICATIONS

International Search Report and Written Opinion for International Application No. PCT/US2021/064293, 10 pages.

*Primary Examiner* — Brian L Swenson
(74) *Attorney, Agent, or Firm* — Baker Botts L.L.P.

(57) ABSTRACT

Motor control systems and methods for micromobility transit vehicles are provided. A micromobility transit vehicle may include an electric motor configured to drive a rotation of a wheel. The electric motor may include a plurality of windings and a plurality of switching circuits. The switching circuits may be configured to selectively direct current from a power supply through the windings to generate a torque by the electric motor to drive the rotation of the wheel in response to associated control signals. The switching circuits may be configured to passively bypass the windings in response to an interruption of the control signals. Depletion of the power supply may result in the interruption of the control signals.

20 Claims, 15 Drawing Sheets

(51) Int. Cl.
*B62J 45/20* (2020.01)
*B62M 6/90* (2010.01)
*B62L 1/00* (2006.01)
*H02K 7/00* (2006.01)
*H02K 11/00* (2016.01)
*H02K 11/33* (2016.01)
*H02K 21/22* (2006.01)
*H02P 3/14* (2006.01)
*B62M 6/45* (2010.01)

(56) References Cited

U.S. PATENT DOCUMENTS

| | | | | |
|---|---|---|---|---|
| 2014/0049214 | A1* | 2/2014 | Chang | B60L 15/2054 320/109 |
| 2015/0042160 | A1* | 2/2015 | Matsuda | B62J 43/16 307/10.3 |
| 2016/0096493 | A1* | 4/2016 | Suzuki | H02J 7/00714 307/9.1 |
| 2021/0403110 | A1* | 12/2021 | Zhang | B62J 6/24 |
| 2022/0258624 | A1* | 8/2022 | Deppe | B60L 53/36 |

* cited by examiner

MOTOR CONTROL SYSTEMS AND METHODS FOR MICROMOBILITY TRANSIT VEHICLES

TECHNICAL FIELD

One or more embodiments of the present disclosure relate generally to micromobility transit vehicles and more particularly, for example, to motor control systems and methods for micromobility transit vehicles.

BACKGROUND

Micromobility transit vehicles for hire (e.g., shared scooters, sit-scooters, bicycles, etc.) represent a significant investment for a ridesharing company. These and other considerations make it desirable to immobilize or otherwise limit movement of the vehicle in an unauthorized manner. Some legacy vehicles include anti-tampering mechanisms that actively limit unauthorized movement of the vehicle. Such mechanisms may be easily disabled, such as via cutting power to the anti-tampering mechanisms.

Therefore, there is a need in the art for systems and methods that address the deficiencies noted above, other deficiencies known in the industry, or at least offers an alternative to current techniques. For example, improvements are needed for a system that passively limits unauthorized movement of a micromobility transit vehicle, even when a local power source is depleted, removed, or otherwise tampered with.

SUMMARY

Techniques are disclosed for motor control systems and methods for micromobility transit vehicles. In accordance with one or more embodiments, a micromobility transit vehicle is provided. The micromobility transit vehicle may include an electric motor configured to drive a rotation of a wheel. The electric motor may include a plurality of windings and a plurality of switching circuits configured to selectively direct current from the power supply through the windings to generate a torque by the electric motor to drive the rotation of the wheel in response to associated control signals. The switching circuits may be configured to passively bypass the windings in response to an interruption of the control signals.

One or more embodiments provide a method of controlling an electric motor of a micromobility transit vehicle. The method may include selectively directing current from a power supply through a plurality of windings of the electric motor via a plurality of switching circuits to generate a torque by the electric motor to drive a rotation of a wheel of the micromobility transit vehicle in response to associated control signals. The method may include passively bypassing the windings via the switching circuits in response to an interruption of the control signals.

One or more embodiments provide a micromobility transit vehicle. The micromobility transit vehicle may include a wheel, a battery, and an electric motor defining a hub of the wheel and configured to drive a rotation of the wheel. The electric motor may include a plurality of windings and a plurality of switching circuits configured to selectively direct current from the battery through the windings to generate a torque by the electric motor to drive the rotation of the wheel in response to associated control signals. The switching circuits may be configured to passively bypass the windings in response to an interruption of the control signals.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. In addition, various aspects and features may be omitted. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, motor control systems and methods for micromobility transit vehicles is provided. In embodiments, immobilizing or braking a micromobility transit vehicle may be realized by passively shorting the windings of an electric motor through shorting circuitry. The shorting circuitry may be provided within the motor housing, such as on a circuit board within the electric motor, to limit tampering of the circuitry.

The shorting circuitry may be implemented without requiring any active electronics. Thus, the shorting circuitry may be "self-exciting." For example, P-type transistors may be used to short the windings of electric motor, with the P-type transistors being turned off only in response to a control signal provided a controller. Such configurations may permit the micromobility transit vehicle to remain immobilized or passively braked even when a local power supply (e.g., a battery) is depleted. In addition, this approach may not rely on any external mechanical features (to immobilize or passively brake micromobility transit vehicle) that could be vandalized.

The control signals provided to the shorting circuitry may be based a trigger signal provided remotely (e.g., wirelessly). For example, the trigger signal may cause an interruption of the control signals to the shorting circuitry to slow down and/or immobilize a stolen vehicle or a vehicle moving in an unauthorized manner as detected by GPS, Wi-Fi, or another sensor/signal.

Due to the nature of the physical operation of the shorted motor, the micromobility transit vehicle may be slowed down in a gradual and safe manner (e.g., instead of applying an immediate full force remote braking operation). In embodiments, the shorted windings may induce currents that resist further changes in magnetic fields in response to rotation. Thus, when external forces are applied to rotate the electric motor (e.g., by a rider pedaling), the overall external force required to rotate the electric motor increases dramatically, which may counteract the rider's further pedaling and thus bring the micromobility transit vehicle to a safe stop or otherwise immobilize the micromobility transit vehicle.

Figure 1:
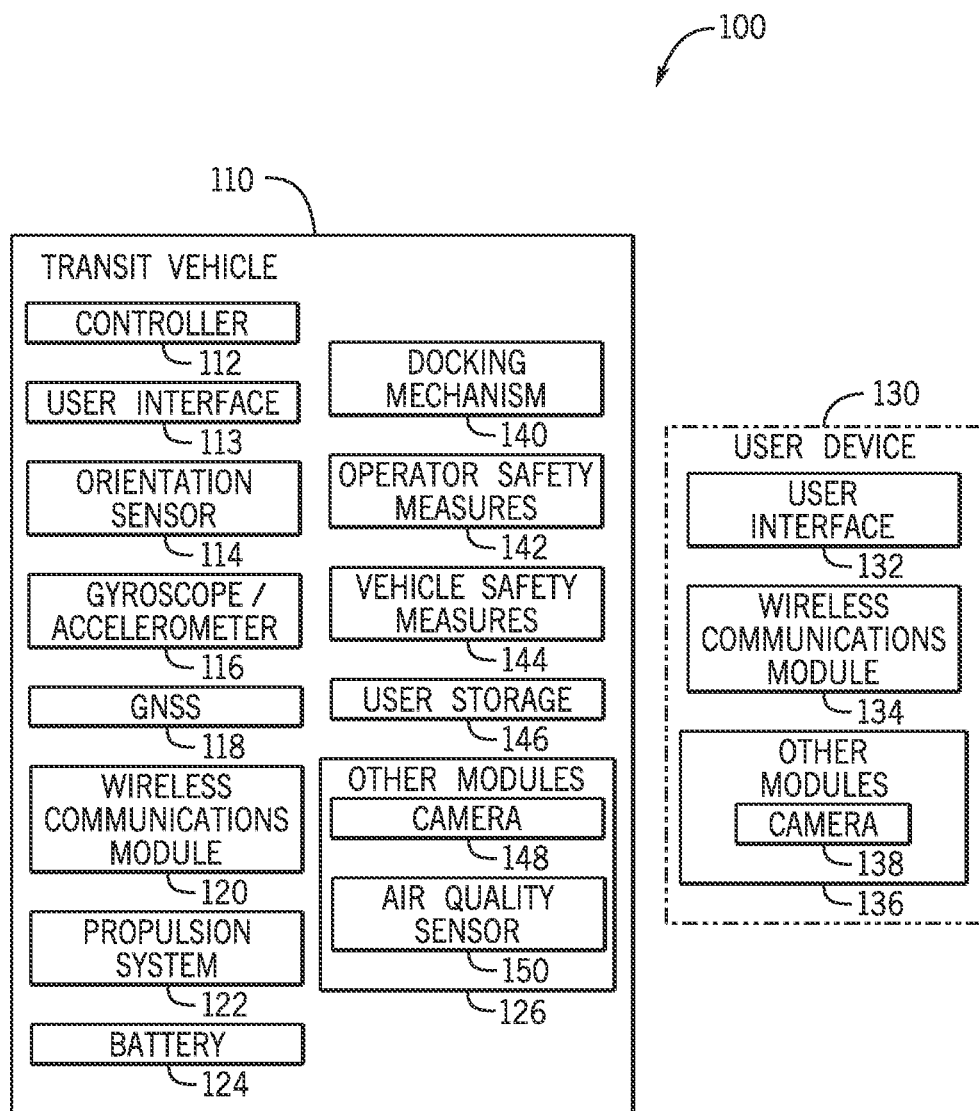
FIG. 1 illustrates a block diagram of a portion of a dynamic transportation matching system including a transit vehicle, in accordance with an embodiment of the disclosure.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
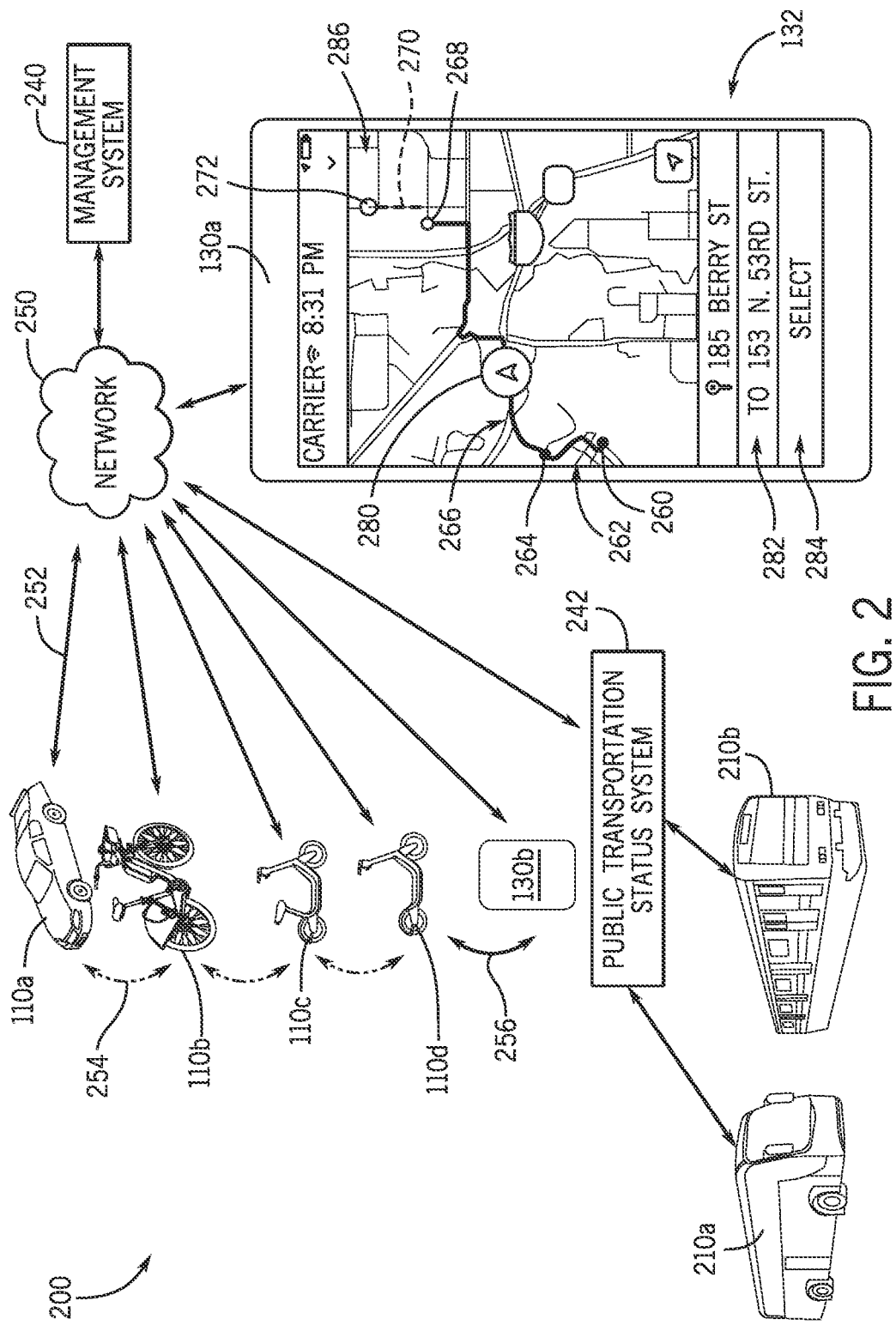
FIG. 2 illustrates a block diagram of a dynamic transportation matching system incorporating a variety of transportation modalities, in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
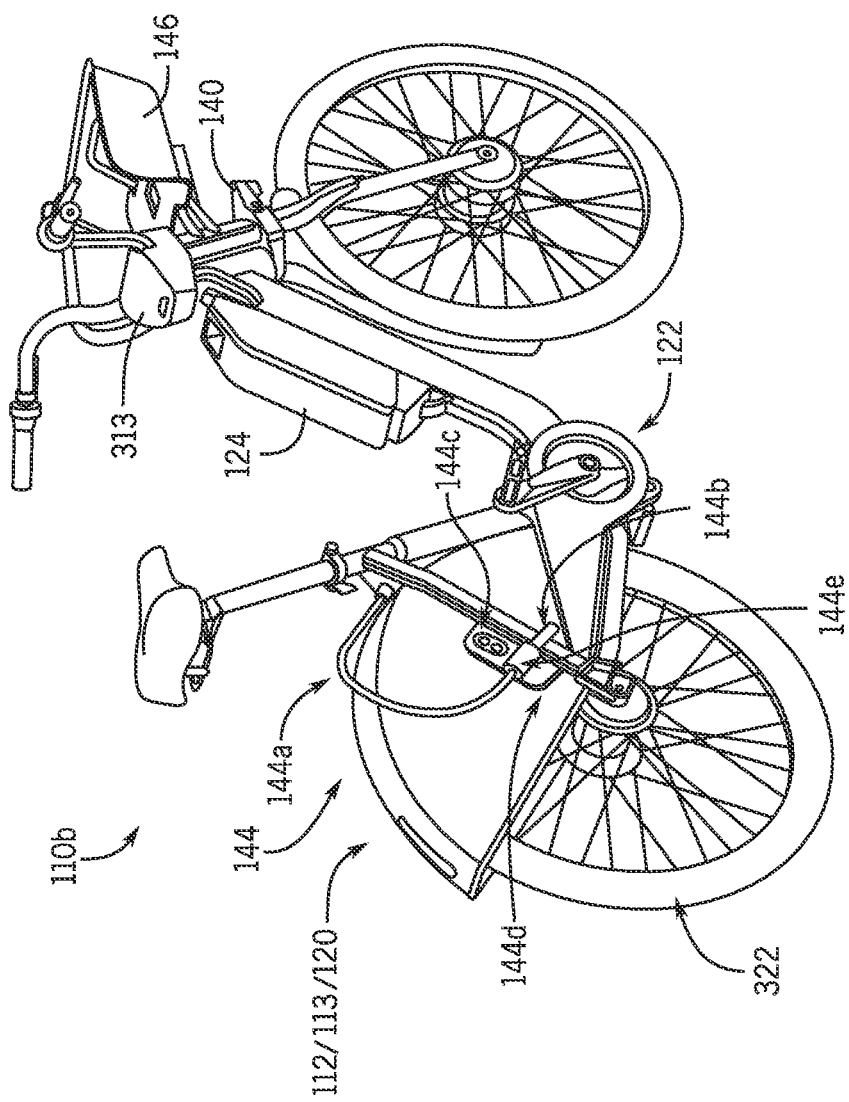
FIGS. 3A, 3B, and 3C illustrate respective diagrams of micromobility transit vehicles for use in a dynamic transportation matching system, in accordance with an embodiment of the disclosure.
Figure 3B:
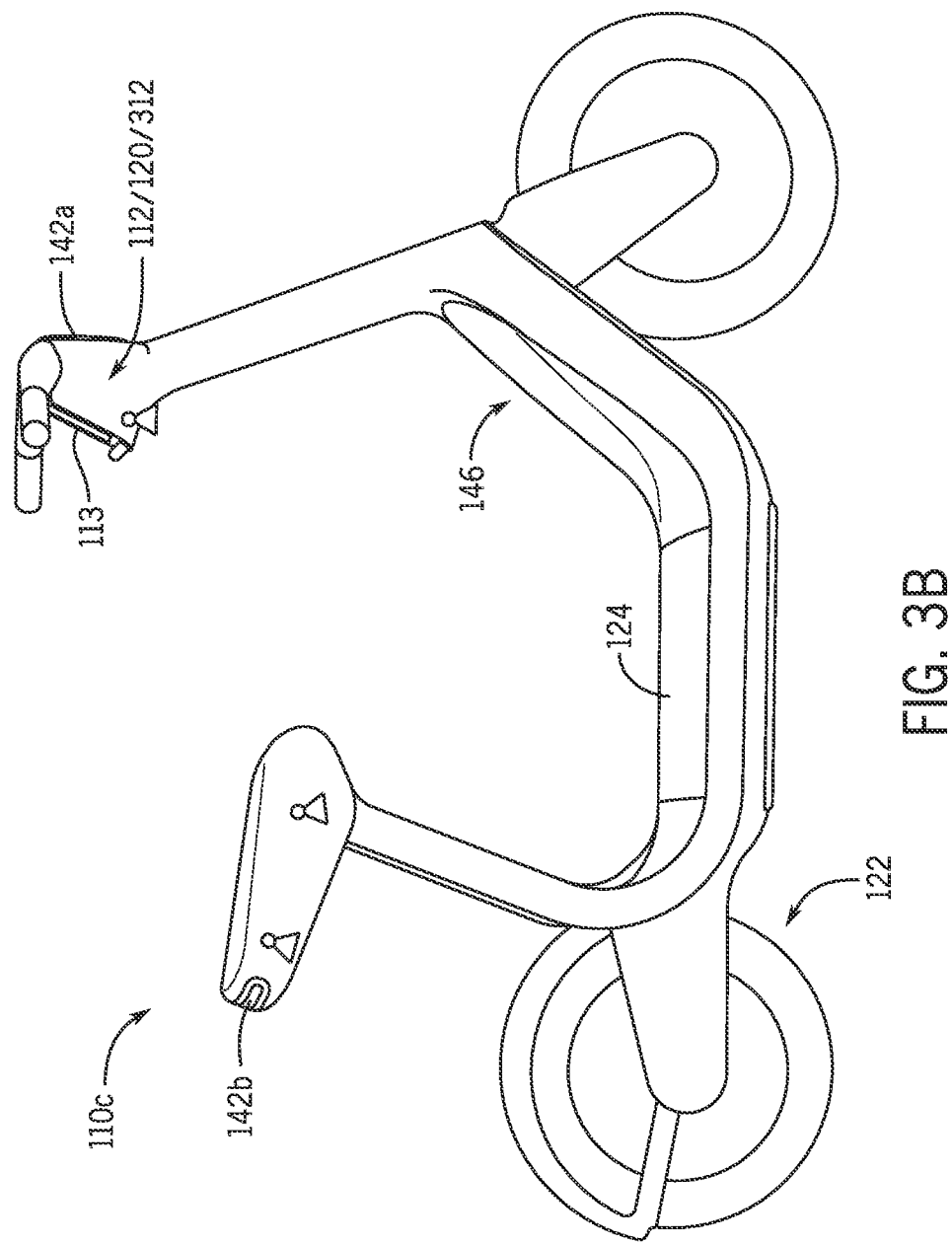
Figure 3C:
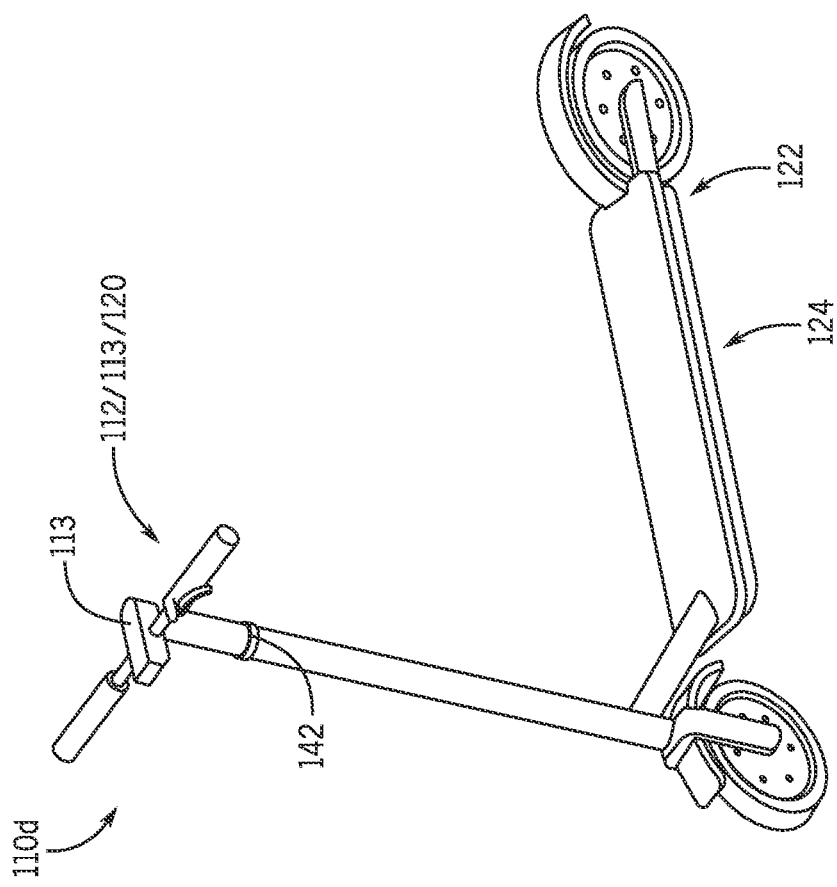

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize transit vehicle 110*b* by default, thereby requiring a transportation requester or rider to transmit a request to management system 240 (e.g., via user device 130) to reserve transit vehicle 110*b* before attempting to use transit vehicle 110*b*. The request may identify transit vehicle 110*b* based on an identifier (e.g., a QR code, a barcode, a serial number, etc.) presented on transit vehicle 110*b* (e.g., such as by user interface 113 on a rear fender of transit vehicle 110*b*). Once the request is approved, management system 240 may transmit an unlock signal to transit vehicle 110*b* (e.g., via network 250). Upon receiving the unlock signal, transit vehicle 110*b* (e.g., controller 112 of transit vehicle 110*b*) may release vehicle security device 144 and unlock rear wheel 322 of transit vehicle 110*b*.

Transit vehicle 110*c* of FIG. 3B may correspond to a motorized sit-scooter integrated with the various elements of system 100 and may be configured to participate in dynamic transportation matching system 200 of FIG. 2. As shown in FIG. 3B, transit vehicle 110*c* includes many of the same elements as those discussed with respect to transit vehicle 110*b* of FIG. 3A. For example, transit vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of head lights, programmable light strips, and/or reflective strips.

Transit vehicle 110*d* of FIG. 3C may correspond to a motorized stand or kick scooter integrated with the various elements of system 100 and may be configured to participate in dynamic transportation matching system 200 of FIG. 2. As shown in FIG. 3C, transit vehicle 110*d* includes many of the same elements as those discussed with respect to transit vehicle 110*b* of FIG. 3A. For example, transit vehicle 110*d* may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
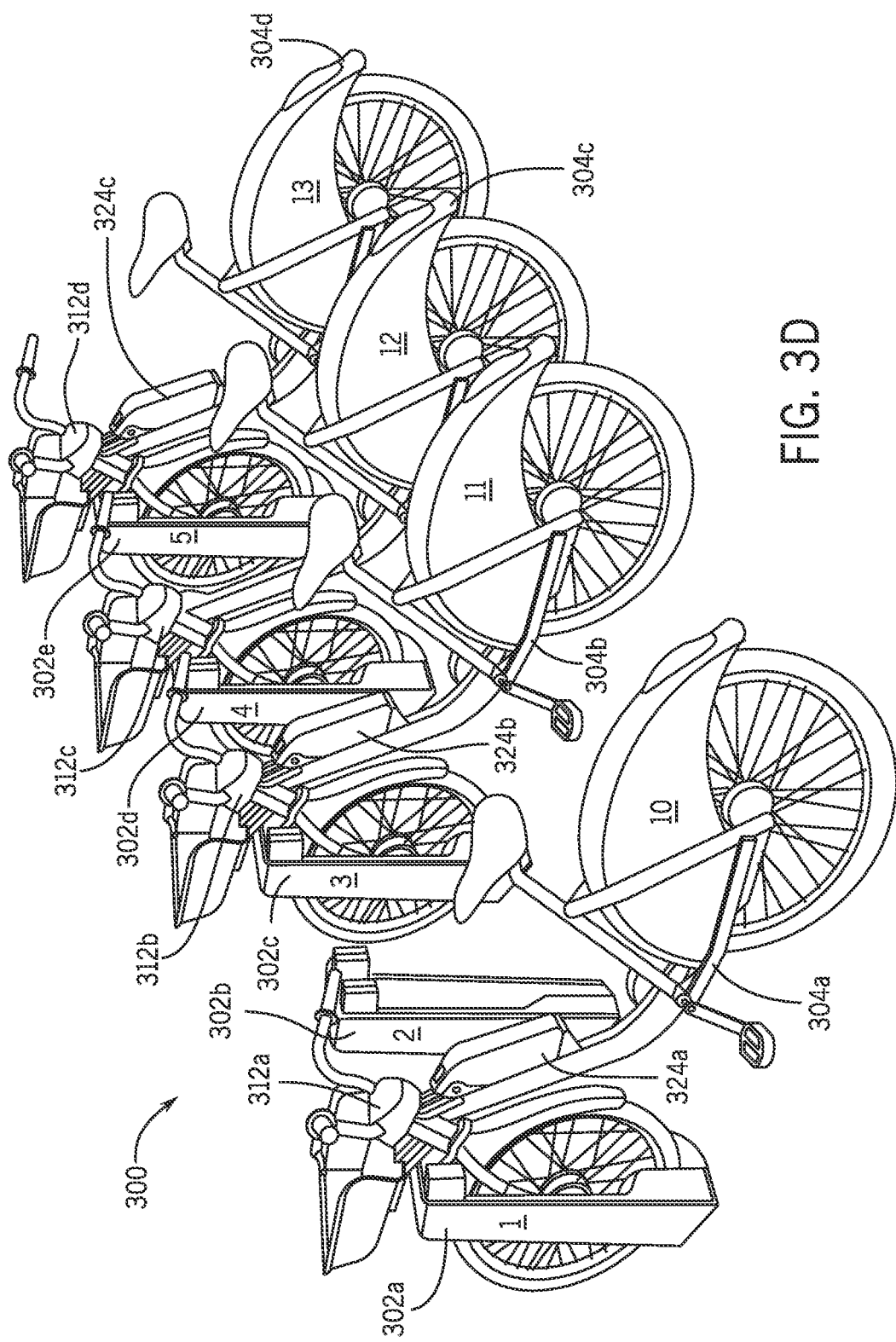
FIG. 3D illustrates a diagram of a docking station for docking one or more micromobility transit vehicles, in accordance with an embodiment of the disclosure.

FIG. 3D illustrates a docking station 300 for docking transit vehicles (e.g., transit vehicles 110*c*, 110*e*, and 110*g*, etc.) according to one embodiment. As shown, docking station 300 may include multiple bicycle docks, such as docks 302*a-e*. In this example, a single transit vehicle (e.g., any one of electric bicycles 304*a-d*) may dock in each of the docks 302*a-e* of the docking station 300. Each of the docks 302*a-e* may include a lock mechanism for receiving and locking docking mechanism 140 of the electric bicycles 304*a-d*. In some embodiments, once a transit vehicle is docked in a bicycle dock, the dock may be electronically coupled to the transit vehicle (e.g., controllers 312*a-d* of the transit vehicle) via a link such that the transit vehicle and the dock may communicate with each other via the link.

A transportation requester or rider may use a user device (e.g., user device 130) to use a micromobility transit vehicle 110*b-d* that is docked in one of the bicycle docks 302*a-e* by transmitting a request to management system 240. Once the request is processed, management system 240 may transmit an unlock signal to a micromobility transit vehicle 110*b-d* docked in the dock and/or the dock via network 250. The docking station 300 may automatically unlock the lock mechanism to release the micromobility transit vehicle 110*b-d* based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
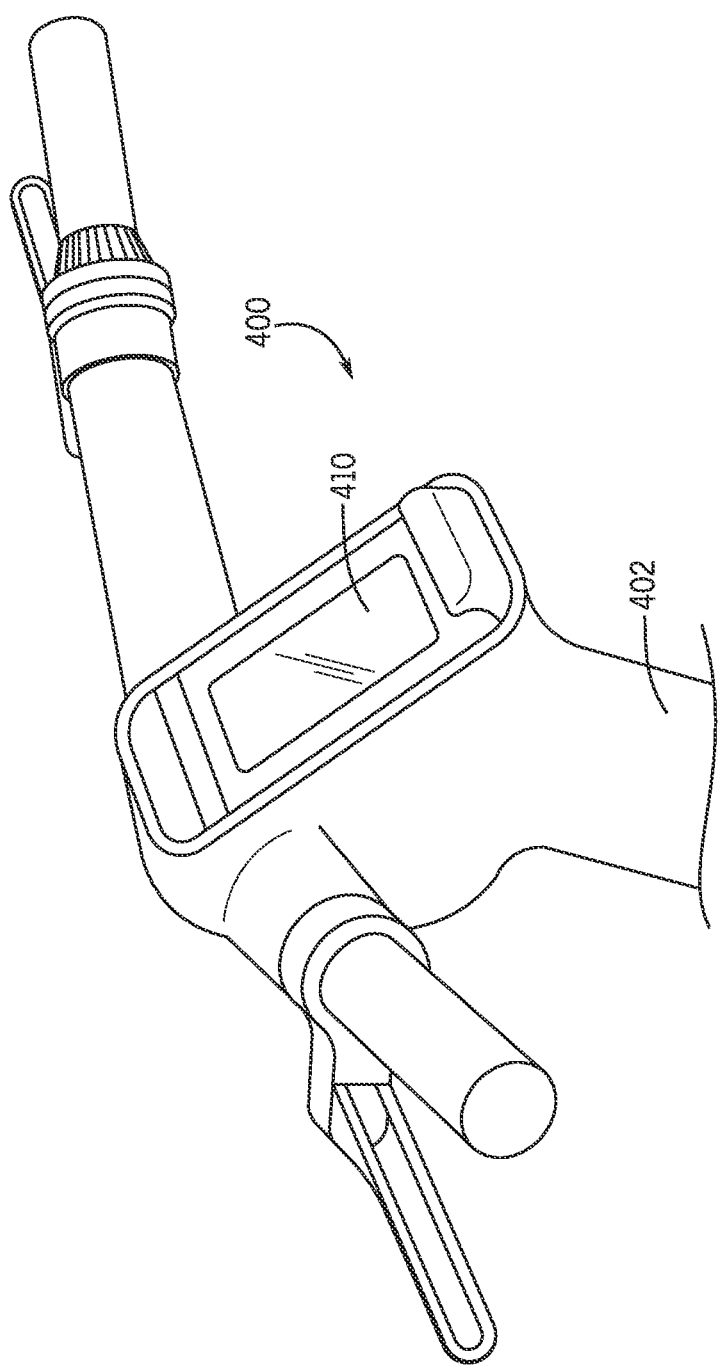
FIG. 4 illustrates a diagram of a user interface associated with a micromobility transit vehicle, in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110*b*, 110*c*, or 110*d*, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S. patent application Ser. No. 16/578,995, entitled "MICROMOBILITY ELECTRIC VEHICLE WITH ELECTRONIC DEVICE HOLDER AND INTEGRATED DISPLAY," which is incorporated herein in its entirety for all purposes.

Figure 5A:
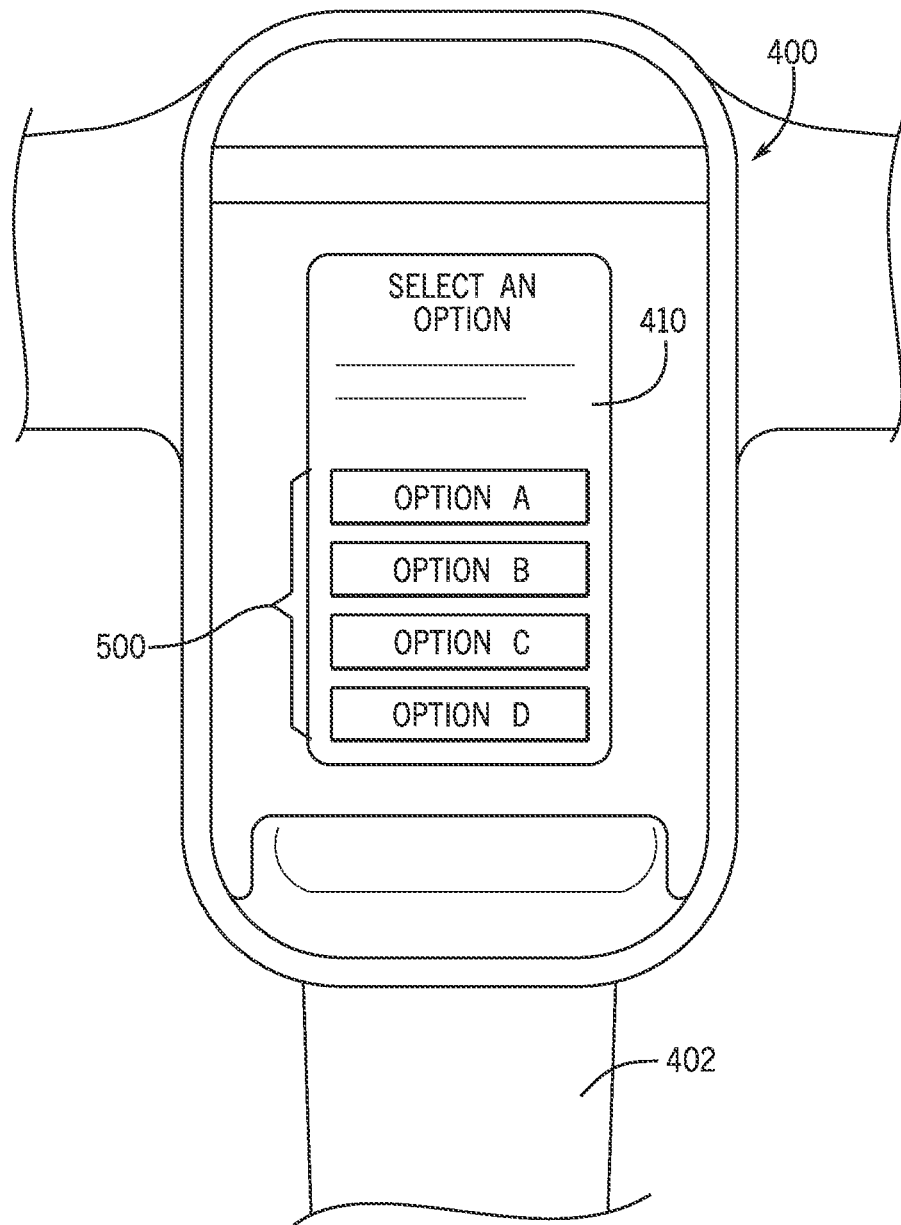
FIGS. 5A, 5B, and 5C illustrate respective diagrams of various examples of information rendered on a display of the user interface of FIG. 4, in accordance with an embodiment of the disclosure.
Figure 5B:
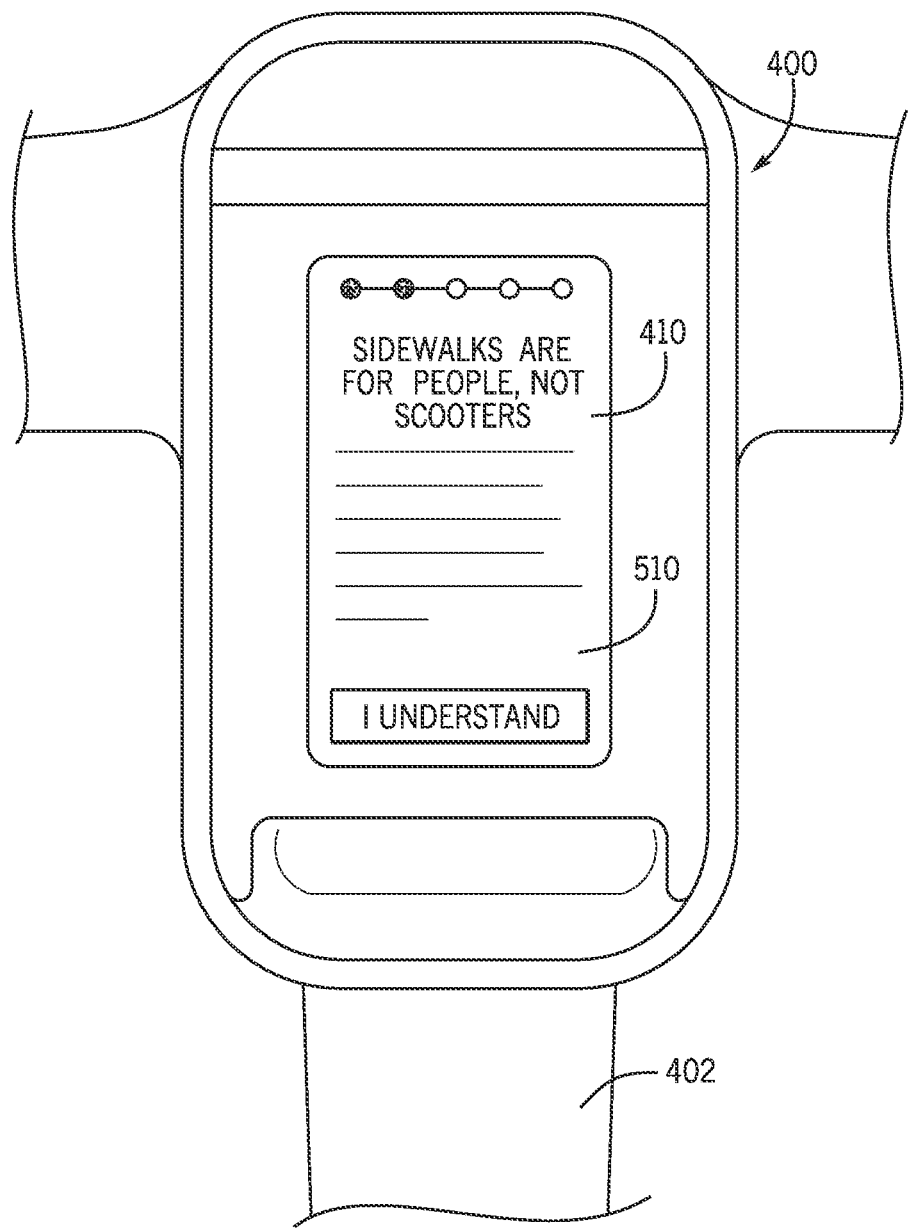
Figure 5C:
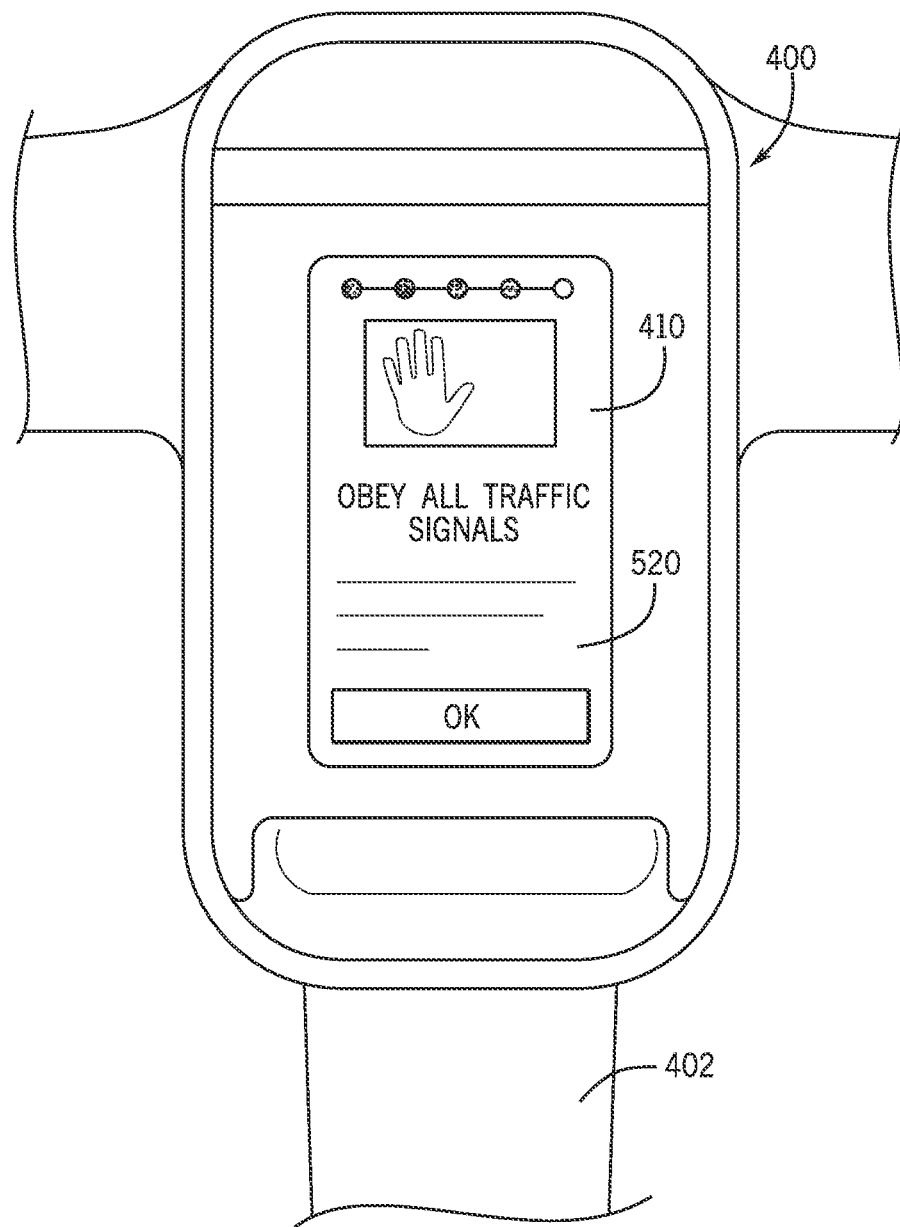

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
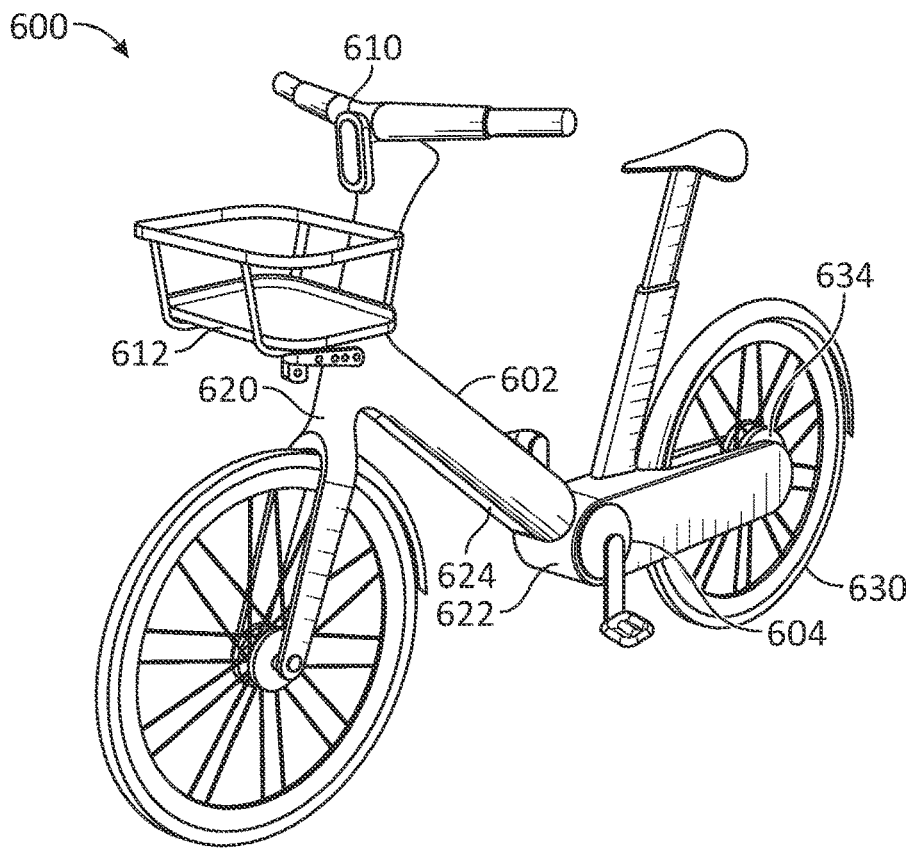
FIG. 6 illustrates a top, front perspective view of a micromobility transit vehicle, in accordance with an embodiment of the disclosure.
Figure 7:
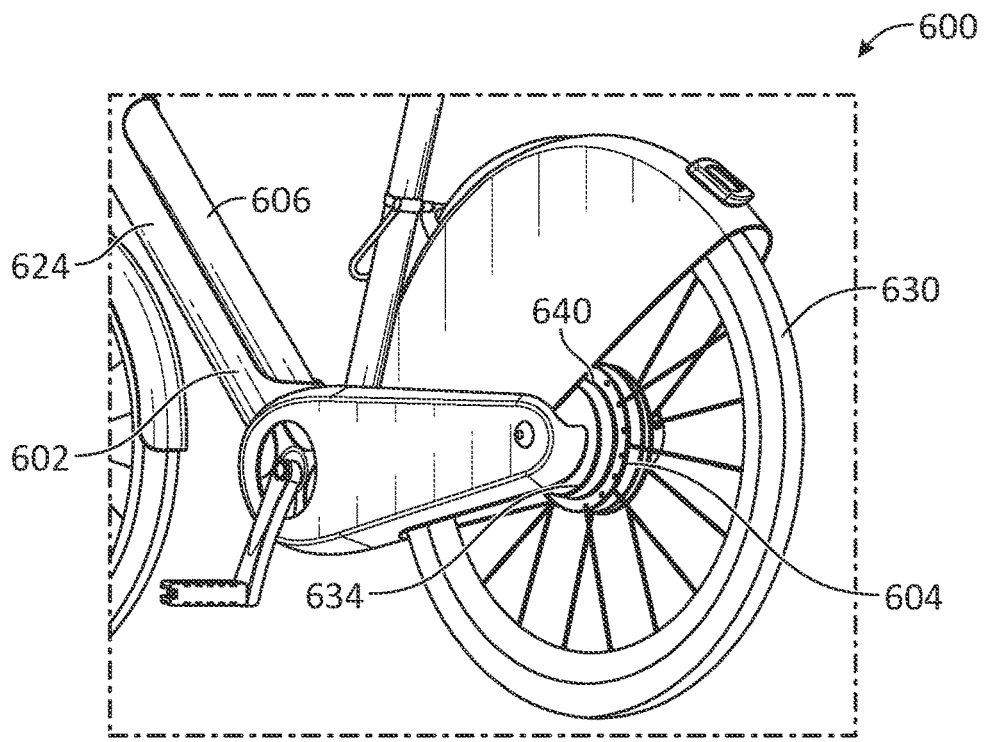
FIG. 7 illustrates a bottom, rear perspective view of the micromobility transit vehicle of FIG. 6, in accordance with an embodiment of the disclosure.

FIG. 6 illustrates a top, front perspective view of a micromobility transit vehicle 600, in accordance with an embodiment of the disclosure. FIG. 7 illustrates a bottom, rear perspective view of the micromobility transit vehicle 600 of FIG. 6, in accordance with an embodiment of the disclosure. Referring to FIGS. 6-7, the micromobility transit vehicle 600 includes a frame 602, a propulsion system 604, and a battery 606. In embodiments, the micromobility transit vehicle 600 may include a cockpit assembly 610 and a storage basket 612. The micromobility transit vehicle 600 may be similar to any one of transit vehicles 110b, 110c, or 110d, described above. Thus, any description above of like features is incorporated herein for micromobility transit vehicle 600.

The frame 602 may include many configurations. For example, the frame 602 may include any number of tubes, brackets, and other components, such as a headtube 620, a bottom bracket 622, a downtube 624 extending between the headtube 620 and the bottom bracket 622. The bottom bracket 622 may rotatably support a portion of the propulsion system 604, such as a crankset configured to drive a rear wheel 630 through reciprocating motion of a rider's legs. In some embodiments, the frame 602 may include other tubes, such as a seat tube supporting a seat. In some embodiments, the frame 602 may include a top tube, though such is not required, as illustrated in FIG. 6. Thus, the frame 602 may include any number of frame members coupled together to form a support structure for the various components of the micromobility transit vehicle 600.

The propulsion system 604 may be any system or device operable to provide a motive force to at least one wheel of the micromobility transit vehicle 600 (e.g., the rear wheel 630) to propel the micromobility transit vehicle 600 across a surface (e.g., a road surface, a sidewalk, a path, a trail, etc.). The propulsion system 604 may be similar to propulsion system 122 described above, such as including an electric motor 634 configured to drive a rotation of a wheel (e.g., the rear wheel 630) of micromobility transit vehicle 600. The rotation of rear wheel 630 can be controlled remotely or otherwise in either direction of rotation. For example, the electric motor 634 may drive clockwise or counterclockwise rotation of rear wheel 630. In some embodiments, at least some portions of the propulsion system 604 may be housed within the frame 602 or other portions (e.g., housings) of the micromobility transit vehicle 600. As shown, the electric motor 634 may define a portion of the rear wheel 630. For example, the electric motor 634 may define at least a portion of a hub 640 of the rear wheel 630.

The battery 606 may be configured to provide electric power to the micromobility transit vehicle 600. For example, the battery 606 may be configured to provide electric power to the propulsion system 604 (e.g., to the electric motor 634) to propel the micromobility transit vehicle 600, for example, as well as to various other modules of the micromobility transit vehicle 600. The battery 606 may be implemented with one or more battery cells, controllers, and/or safety measures. For example, the battery 606 may include thermal interlocks and one or more logic devices, sensors, and/or a display to monitor and provide visual feedback of a charge status of the battery 606 (e.g., a charge percentage, a low charge indicator, etc.). The battery 606 may be similar to battery 124 described above.

Other modules powered by the battery 606 may include other and/or additional sensors, actuators, communications modules, and/or user interface devices, for example. In some embodiments, the other modules may include one or more proximity sensors, cameras, lights (e.g., a headlight, indicator lights, etc.), alarms, environmental sensors, dynamic sensors, propulsion control systems, and the like. In some embodiments, the battery 606 may include an architecture similar to that described in U.S. patent application Ser. No. 16/728,600, filed Dec. 27, 2019, and entitled "VEHICLE BATTERY INTEGRATION SYSTEMS AND METHODS," or in U.S. patent application Ser. No. 16/836,259, filed Mar. 31, 2020, and entitled "VEHICLE BATTERY SECURING SYSTEMS AND METHODS," which are incorporated herein by reference in their entireties.

As best illustrated in FIG. 7, battery 606 may be receivable within a battery compartment disposed in the frame 602 (e.g., the downtube 624). As a result, the battery 606 may be integrated into or placed within the frame 602, rather than exposed. For example, at least a portion of the battery 606 may be positioned within the battery compartment to secure the battery 606 to the frame 602. In such embodiments, the battery compartment may be shaped to receive the battery 606 or at least a portion of the battery 606 therein. Such configurations may provide a secure attachment of the battery 606 to the frame 602. Additionally, or alternatively, such configurations may provide an attachment that is less prone to vandalism and/or damage or at least limits vandalism and/or damage to the battery 606. For example, receipt of the battery 606 at least partially within the battery compartment may shield vulnerable portions of the battery 606 positioned within the frame 602. In embodiments, the battery 606 and/or the securement of the battery 606 within the battery compartment may be similar to that described in U.S. patent application Ser. No. 16/917,102, filed Jun. 30, 2020, and entitled "MICROMOBILITY TRANSIT VEHICLE BATTERY CONNECTION AND LOCK SYSTEMS AND METHODS," which is incorporated herein by reference in its entirety.

The cockpit assembly 610 may provide a functional, intuitive, and distinctive cockpit or user interface for the rider when riding the micromobility transit vehicle 600. For example, the cockpit assembly 610 may be implemented with several interfaces, components, or features allowing the rider to see, verify, or control one or more operations of the micromobility transit vehicle 600. The cockpit assembly 610 may form at least part of an outer housing for the micromobility transit vehicle's handlebars. In some embodiments, the cockpit assembly 610 may include user interface 400 described above. In some embodiments, the cockpit assembly 610 may be similar to the cockpit assembly disclosed in U.S. patent application Ser. No. 16/729,070, filed Dec. 27, 2019, and entitled "MICRO-MOBILITY FLEET VEHICLE COCKPIT ASSEMBLY SYSTEMS AND METHODS," which is incorporated herein in its entirety for all purposes.

The storage basket 612 may be coupled to frame 602, such as to the headtube 620, and may provide one or more functional benefits. For instance, the storage basket 612 may be configured to store a rider's belongings during a ride. In some examples, the storage basket 612 may be configured to provide a locking function. For example, the micromobility transit vehicle 600 may be locked or otherwise secured to a docking station or other stationary object via one or more components of the storage basket 612, such as a lock cable of the storage basket 612. In some embodiments, the storage basket 612 may be similar to the storage basket disclosed in U.S. patent application Ser. No. 15/930,195, filed May 12, 2020, and entitled "MICROMOBILITY TRANSIT VEHICLE LOCK-TO MECHANISM SYSTEMS AND METHODS," which is incorporated herein in its entirety for all purposes.

Figure 8:
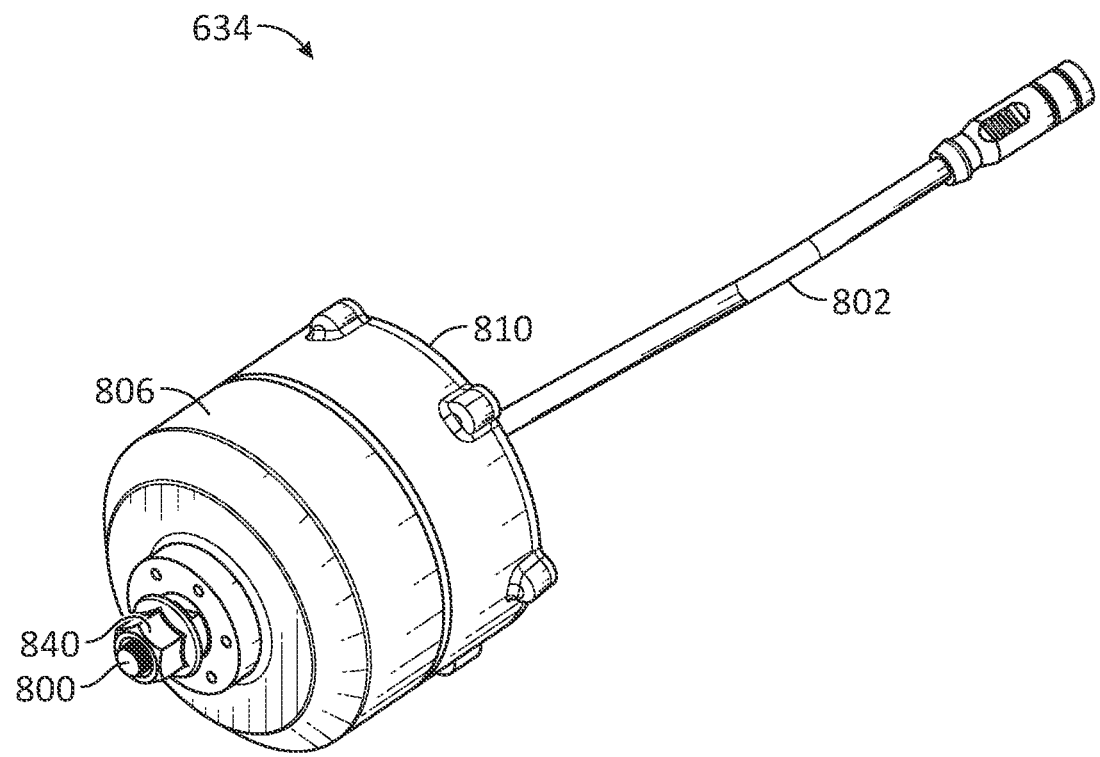
FIG. 8 illustrates a diagram of an electric motor, in accordance with an embodiment of the disclosure.
Figure 9:
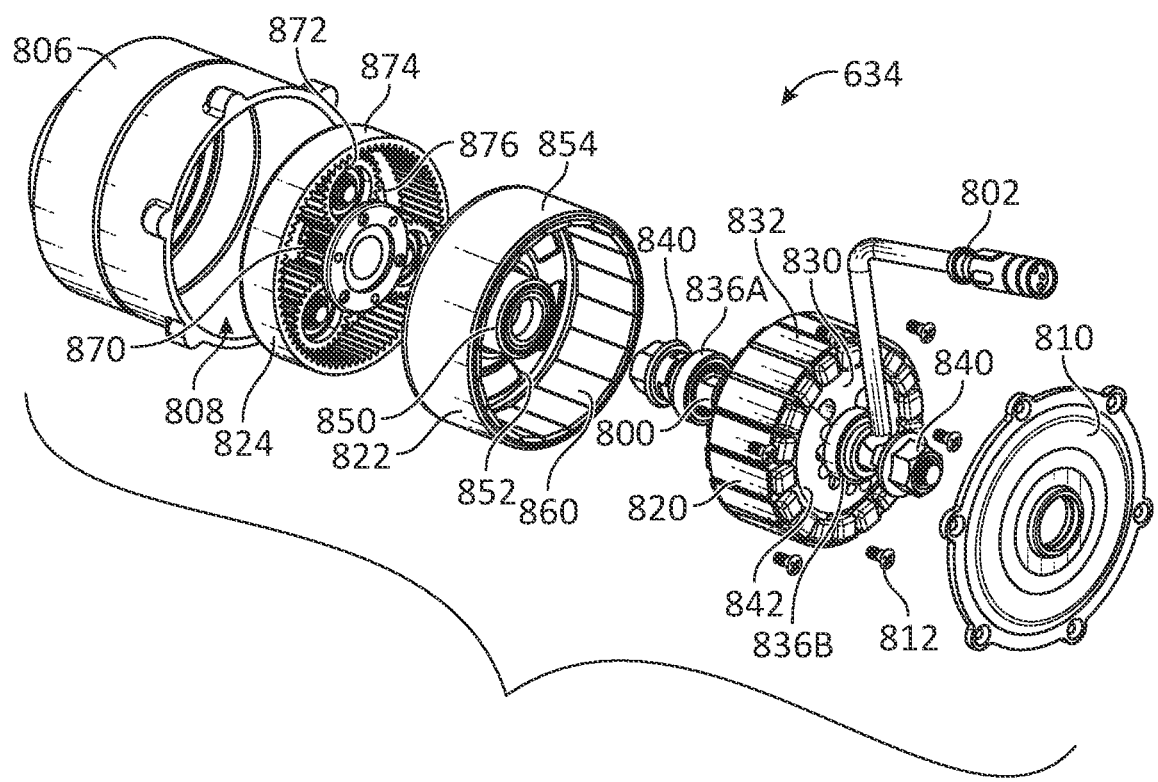
FIG. 9 illustrates an exploded view of the electric motor, in accordance with an embodiment of the disclosure.

FIG. 8 illustrates a diagram of electric motor 634, in accordance with an embodiment of the disclosure. FIG. 9 illustrates an exploded view of electric motor 634, in accordance with an embodiment of the disclosure. Referring to FIGS. 8-9, the electric motor 634 may define at least a portion of a drive assembly for micromobility transit vehicle 600. For example, electric motor 634 may have a form factor defining the hub 640 of rear wheel 630, with the rear axle 800 securing the electric motor 634 to the frame 602 of micromobility transit vehicle 600. As shown, a motor cable 802 may extend from the electric motor 634 for connection to a motor controller or microcontroller unit (MCU) of micromobility transit vehicle 600. For example, motor cable 802 may run along or through at least a portion of a chain stay (or other portion) of micromobility transit vehicle 600 for connection to an MCU (not shown for illustration purposes).

Referring to FIG. 9, electric motor 634 may include a casing (or housing) 806 defining a cavity 808, and a cover 810 attached to the casing 806 (via one or more fasteners 812) to enclose one or more components positioned within the cavity 808. For example, electric motor 634 may include a stator 820, a rotor 822, and a gear train 824 positioned at least partially within the cavity 808 of casing 806. As shown, stator 820 may include a core 830, with the rear axle 800 and a plurality of windings 832 connected to the core 830. For example, the core 830 may be press-fit or otherwise connected to rear axle 800. In some embodiments, the core 830 may define at least a portion of rear axle 800. As shown, the rear axle 800 may include a pair of bearings near opposing ends of rear axle 800, such as a first bearing 836A on a first side of stator 820 and a second bearing 836B on a second side of stator 820. The first bearing 836A may be connected to the casing 806 and the second bearing 836B may be connected to the cover 810 to allow rotation of casing 806 and cover 810 relative to the rear axle 800. A pair of axle nuts 840 may be threaded to rear axle 800 to secure rear axle 800 to micromobility transit vehicle 600, such as to a pair of rear dropouts. As shown, the motor cable 802 may be coupled to the rear axle 800, although other configurations are contemplated.

The windings 832 may be positioned along a periphery of core 830. The windings 832, which may be formed of copper, may be connected to a power source (e.g., battery 606) through motor cable 802. The windings 832 may create an electromagnet when current is applied to windings 832. For example, current may be applied to windings 832 in a sequential or other fashion around core 830 to create a rotating magnetic field that drives rotation of rotor 822 around stator 820. Stator 820 may include any suitable number of windings 832, such as eighteen windings 832 as shown, more than eighteen windings 832, or less than eighteen windings 832. In some embodiments, a printed circuit board (PCB) 842 may be connected to the core 830, such as between the windings 832 and rear axle 800. The PCB 842 may be operable to control the electric motor 634, as detailed below.

The rotor 822 may include a hub 850 rotatable about the rear axle 800 and a basket 852 extending from the hub 850. The basket 852 may include a rim 854 positioned around the periphery of the stator 820. As shown, a plurality of permanent magnets 860 may be positioned on the interior of the rim 854, such that the magnets 860 are positioned adjacent to the windings 832 of the stator 820. Depending on the application, the number of magnets 860 may be equal to, less than, or greater than the number of windings 832. For example, the rotor 822 may include twenty magnets 860 aligned along the interior of the rim 854, although other configurations are contemplated. In embodiments, the number of magnets 860 and windings 832, as well as the ratio of magnets 860 to windings 832, may be configured based on a desired characteristic of electric motor 634 (e.g., torque output, torque curve, response, quietness of operation, etc.). In embodiments, the rotor 822 may be coupled to or define at least a portion of the hub 640 of rear wheel 630 to rotate the rear wheel 630, as explained below.

With continued reference to FIG. 9, gear train 824 may be operable to rotate the casing 806 with rotation of rotor 822. The gear train 824 may provide a desired gear ratio based on the output of electric motor 634 and the expected load on micromobility transit vehicle 600. For example, gear train 824 may provide the required mechanical advantage to propel micromobility transit vehicle 600 under load (e.g., expected weight of a rider) in a variety of conditions (e.g., expected incline and other road conditions). As shown, gear train 824 may be a planetary gear train, with a sun gear 870, a plurality of (e.g., three) planetary gears 872, and a ring gear 874. The planetary gears 872 revolve about the sun gear 870 and may be mounted on a carrier 876. The ring gear 874 meshes with the planetary gears 872. Although a planetary gear train is shown, other configurations are contemplated, including simple gear trains, compound gear trains, reverted gear train, or other epicyclic gear trains.

The gear train 824 may be operable to rotate casing 806 with rotation of rotor 822. For example, ring gear 874 may be press-fit or otherwise coupled to casing 806. Depending on the application, rotation of rotor 822 may cause rotation of sun gear 870 or carrier 876. For example, carrier 876 may be fixed, and sun gear 870 may be coupled to rotor 822. In such embodiments, rotation of rotor 822 may rotate sun gear 870, which causes rotation of planetary gears 872 through the meshed engagement of sun gear 870 with planetary gears 872. Rotation of planetary gears 872 will then cause rotation of ring gear 874, causing rotation of casing 806 to drive rotation of rear wheel 630. In some embodiments, sun gear 870 may be fixed, and carrier 876 may be coupled to rotor 822. In such embodiments, rotation of rotor 822 may rotate carrier 876, which causes rotation of planetary gears 872. Rotation of carrier 876 and planetary gears 872 around sun gear 870 may cause rotation of ring gear 874, causing rotation of casing 806 to drive rotation of rear wheel 630.

In some embodiments, gear train 824 may include a clutch. The clutch may be an overrunning clutch allowing the casing 806 (and rear wheel 630) to freewheel in one direction while driving in another direction of rotation. For example, when the rear wheel 630 is rotating faster than the rotor 822, the clutch may mechanically disconnect to allow free rotation of rear wheel 630. When the rotor 822 is rotating faster than rear wheel 630, the clutch may mechanically connect to drive rotation of rear wheel 630. Depending on the application, the clutch may include a sprag, roller ramp, wrap spring, or wedge design. The clutch may be formed in the carrier 876, sun gear 870, or other portion of gear train 824.

Figure 10:
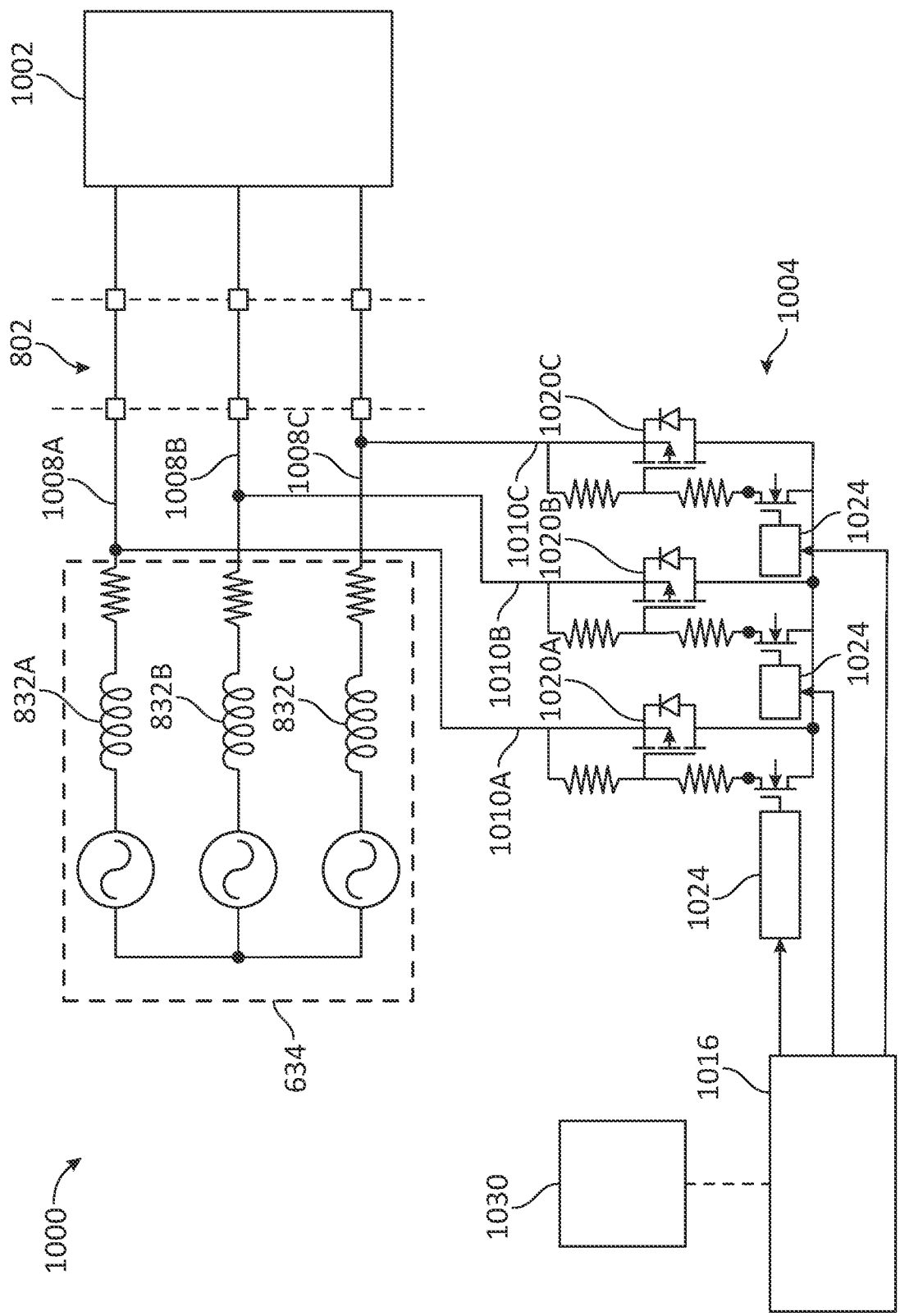
FIG. 10 illustrates a schematic diagram of a motor assembly, in accordance with an embodiment of the disclosure.

FIG. 10 illustrates a schematic diagram of a motor assembly 1000, in accordance with an embodiment of the disclosure. As shown, motor assembly 1000 may include electric motor 634, a motor controller 1002, and switching circuitry 1004. The electric motor 634 may be a multi-phase (e.g., three-phase) motor with one or more windings 832 associated with each phase of electric motor 634. For example, a first set of windings 832A may be associated with a first phase 1008A of electric motor 634, a second set of windings 832B may be associated with a second phase 1008B of electric motor 634, and a third set of windings 832C may be associated with a third phase 1008C of electric motor 634, with each set of windings 832 including one or multiple windings coupled together.

During operation of electric motor 634, current flow through the windings 832 produces a magnetic field that couples to the rotor 822. The magnetic field exerts a torque on the rotor 822 and causes the rotor 822 to rotate. In this regard, the rotor 822 produces a torque of the electric motor 634, and the windings 832 supply a magnetic field that drives the rotation of rotor 822. The torque provided by rotor 822 may be utilized to drive rotation of the rear wheel 630, as noted above. Appropriate logic and circuitry may generate and provide switch control signals to selectively activate (e.g., pass current through) the windings 832 such that the rotor 822 continuously rotates to align (e.g., follow) the permanent magnets 860 with the magnetic field generated by activated windings 832 (e.g., in a sequential manner or otherwise). In other words, the windings 832 are selectively activated to cause the rotor 822 to continuously rotate and produce torque of the electric motor 634 during operation of electric motor 634.

The motor controller 1002 may include appropriate logic and circuitry to direct current from a power supply (e.g., battery 606) to the electric motor 634. For example, motor controller 1002 may direct current to each of the first phase 1008A, second phase 1008B, and third phase 1008C of electric motor 634, such as via motor cable 802. Motor controller 1002 may generate switch control signals to control operation of electric motor 634. For instance, motor controller 1002 may generate switch control signals based on a position (e.g., a present commutation state) of rotor 822. For example, motor controller 1002 may drive or control one or more switches to provide current to the appropriate winding(s) to drive rotation of rotor 822. In embodiments, motor controller 1002 may convert direct current (DC) power from the battery 606 into alternating current (AC) power to drive electric motor 634. Motor controller 1002 may be implemented as one or more microprocessors, microcontrollers, application specific integrated circuits (ASIC s), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices.

With continued reference to FIG. 10, the switching circuitry 1004 may include a plurality of switching circuits 1010, such as a switching circuit associated with each phase of electric motor 634. For example, the switching circuitry 1004 may include a first switching circuit 1010A associated with the first phase 1008A of electric motor 634, a second switching circuit 1010B associated with the second phase 1008B of electric motor 634, and a third switching circuit 1010C associated with the third phase 1008C of electric motor 634. The switching circuits 1010 may be configured to selectively direct current from the power supply through the windings 832 to generate a torque by the electric motor 634 to drive rotation of rear wheel 630 in response to associated control signals. For example, switching circuitry 1004 may include a controller 1016 configured to provide a control signal to each switching circuit. As described herein, the switching circuits 1010 may direct current from the power supply through the windings 832 in response to receiving the control signals. In addition, the switching circuits 1010 may be configured to passively bypass the windings 832 in response to an interruption of the control signals. As a result, current may pass through the windings 832 of electric motor 634 only if the switching circuits 1010 receive the control signals (e.g., from controller 1016). Interruption of the control signals to the switching circuits 1010 may cause the switching circuits 1010 to short the current to the electric motor 634, as described more fully below.

As shown, each switching circuit 1010 may include a P-channel transistor, such as a P-type metal oxide semiconductor field-effect transistor (P-MOSFET) 1020. For example, the first switching circuit 1010A may include a first P-MOSFET 1020A, the second switching circuit 1010B may include a second P-MOSFET 1020B, and the third switching circuit 1010C may include a third P-MOSFET 1020C. The P-MOSFETs may share a common drain node, which may be ground. The source nodes of the P-MOSFETs may be connected to the phases of the electric motor 634. For instance, the source node for the first P-MOSFET 1020A may be connected to the first phase 1008A of the electric motor 634, the source node for the second P-MOSFET 1020B may be connected to the second phase 1008B of the electric motor 634, and the source node for the third P-MOSFET 1020C may be connected to the third phase 1008C of the electric motor 634, although other configurations are contemplated. The gate nodes of the P-MOSFETs may be connected to the controller 1016, such as via respective drivers 1024.

Depending on the application, the switching circuits 1010 may be formed on or otherwise connected to the PCB 842 of electric motor 634, although other configurations are contemplated. As a result, the shorting circuitry may be provided within the motor housing. Such configurations may be effective in reducing undesired tampering of the shorting circuitry, as the circuitry can only be bypassed through disassembly of electric motor 634.

Each P-MOSFET 1020 may be normally switched "ON" (conducting) without the application of a gate bias voltage. That is, each P-MOSFET may conduct when the voltage at the gate node is zero, making each P-MOSFET a "normally-closed" device. Thus, the P-MOSFETs may conduct current from each phase of electric motor 634, thereby shorting the electric motor 634, absent a control signal from controller 1016 turning the P-MOSFETs "OFF." As a result, interruption of a control signal to the P-MOSFETs may bypass the windings 832 of the electric motor 634. Only when control signals are provided to the P-MOSFETs at the gate nodes will the P-MOSFETs be turned "OFF," allowing current to flow through the windings 832 to generate a torque by the electric motor 634 to drive rotation of the rotor 822 (and rear wheel 630, for example).

Interruption of the control signals may provide a desired characteristic or response from electric motor 634 or micromobility transit vehicle 600. For example, interruption of the control signals may cause the electric motor 634 to exhibit a load on the rear wheel 630, resulting in a passive braking force applied on the rear wheel 630. Specifically, the shorted windings 832 may limit the circuitry of the electric motor 634 from passing currents induced by changes in magnetic fields in response to rotation of the magnets 860 of rotor 822. In embodiments, the micromobility transit vehicle 600 may be configured to be immobilized while the control signals are interrupted. For instance, interruption of the control signals may limit or prevent rotation of the rear wheel 630 to limit or prevent undesired movement of micromobility transit vehicle 600. Thus, when external forces are applied to rotate the electric motor 634 (e.g., by a rider pedaling), the overall external force required to rotate the electric motor 634 increases dramatically, which will counteract the rider's further pedaling and thus bring the vehicle to a safe stop. In embodiments, it may be impossible or near impossible to pedal the micromobility transit vehicle 600 from a stopped position when the control signals are interrupted.

The controller 1016 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices. In embodiments, the controller 1016 may be configured to receive a trigger signal to cause the interruption of the control signals. For example, the controller 1016 may be configured to communicate with a remote system 1030, such as a remote network or external device, via wireless or other communication protocols. The remote system 1030 may send a trigger signal, and the trigger signal may be receivable by the controller 1016 from the remote system 1030. The remote system 1030 may send the trigger signal to limit or prevent damage, theft, or vandalism to micromobility transit vehicle 600. For example, the remote system 1030 may send the trigger signal based on a detection of potential theft or vandalism of micromobility transit vehicle 600. In some embodiments, the trigger signal may be sent to slow the micromobility transit vehicle 600 (e.g., via a passive braking force from the electric motor 634) when a detected speed of the micromobility transit vehicle 600 is excessive (e.g., based on conditions or terrain, etc.), above a threshold (e.g., exceeding a speed limit), or otherwise unsafe (e.g., based on age of rider, experience of rider, etc.).

The controller 1016 may be powered by the battery 606 and configured to provide a voltage signal to each driver 1024 of the switching circuits 1010. Depending on the application, each driver 1024 may include appropriate circuitry, devices, or systems to drive the P-MOSFETs. For example, each driver 1024 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices to provide the necessary control signals to the P-MOSFETs.

In embodiments, depletion of battery 606 may result in the interruption of the control signals. For instance, depletion of battery 606 may result in the interruption of the control signals from the controller 1016. Such configurations may provide an anti-tampering characteristic to micromobility transit vehicle 600. For example, removal of battery 606, damage to battery 606, or cutting of the power supply cable may cause interruption of the control signals to the switching circuits 1010, such as from lack of power provided to controller 1016. Depletion of battery 606 may create a load on rear wheel 630. Depletion of battery 606 may passively brake or immobilize micromobility transit vehicle 600 to limit or prevent use of micromobility transit vehicle 600. For example, interruption of the control signals (e.g., due to depletion of battery 606) may result in a regenerative braking force applied to rear wheel 630 and/or locking the rear wheel 630 from moving. This permits micromobility transit vehicle 600 to remain immobilized even when a local power source (e.g., battery 606) is depleted. In addition, this approach does not relay on any external mechanical features that could be vandalized. In embodiments, vehicle immobilization can be performed by the interruption of the control signals and by one or more mechanical locks, such as the mechanical cable lock described above with reference to FIG. 3A.

In some embodiments, micromobility transit vehicle 600 may include one or more smart features controlling the amount of passive braking force provided by bypassing the windings 832 via the switching circuits 1010 in response to an interruption of the control signals. For example, due to the nature of the physical operation of the shorted electric motor 634, the micromobility transit vehicle 600 may be slowed down (e.g., remotely) in a gradual and safe manner (e.g., instead of applying an immediate full force braking operation). In embodiments, the amount of braking force may be adjusted based on the speed of micromobility transit vehicle 600. For example, higher speeds may necessitate a higher braking force, whereas lower speeds may require a lower braking force, to provide a gradual and safe braking of micromobility transit vehicle 600 to a stop. In some embodiments, electric motor 634 may include thermal protection to vary the amount of braking force provided by the shorted electric motor 634. For instance, bypassing the windings 832 of electric motor 634 may be limited when increased temperatures of electric motor 634 are detected, such as to limit failure of electric motor 634 due to excessive heat generation.

Figure 11:
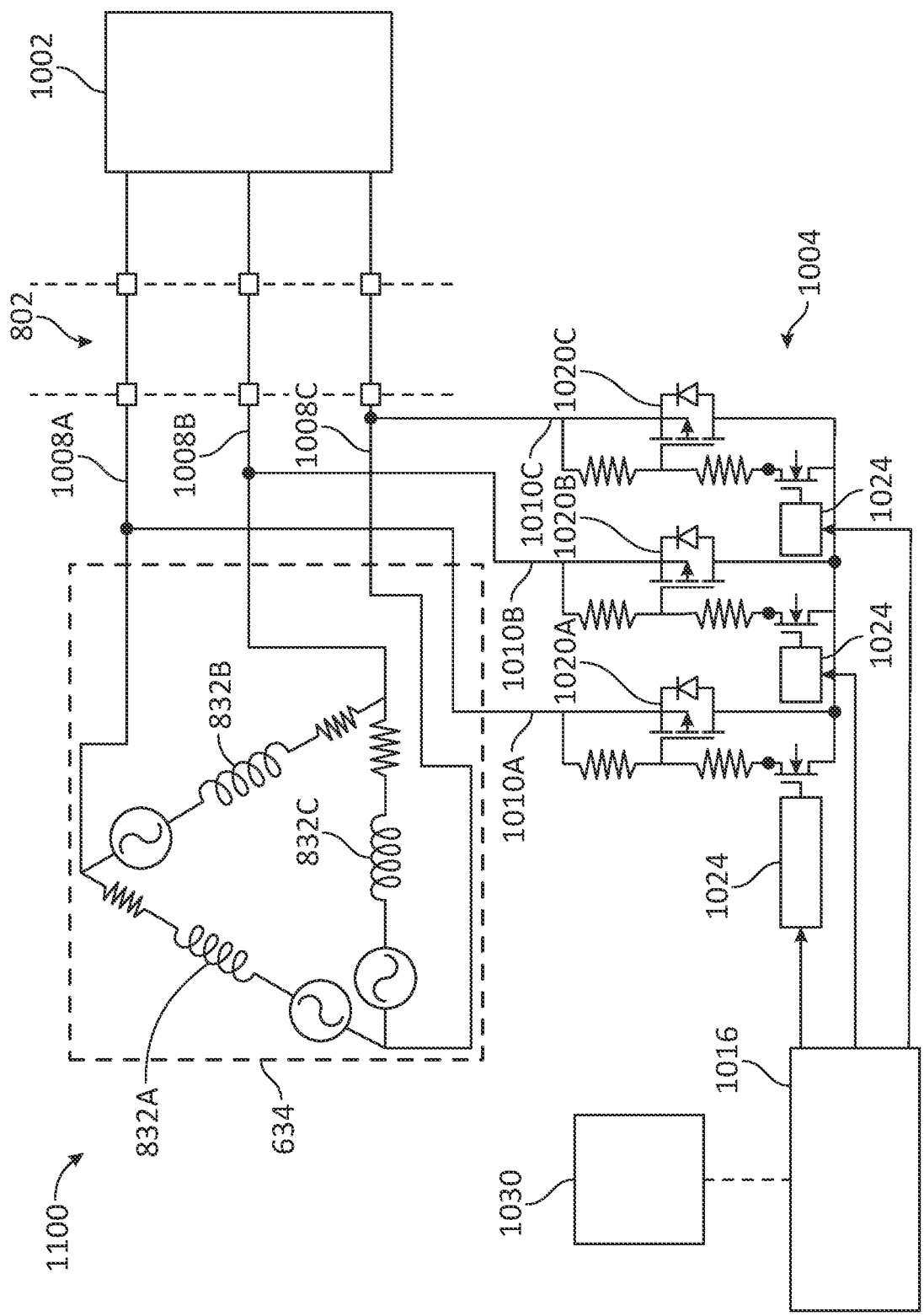
FIG. 11 illustrates a schematic diagram of another motor assembly, in accordance with an embodiment of the disclosure.

Although electric motor 634 in FIG. 10 includes a three-phase wye or star connection, any single or multi-phase configuration may be utilized. For example, FIG. 11 illustrates a schematic diagram of another motor assembly 1100, in accordance with an embodiment of the disclosure. Except as otherwise noted below, the motor assembly 1100 of FIG. 11 may be similar to the motor assembly 1000 of FIG. 10. As shown in FIG. 11, electric motor 634 may include a delta configuration, with the three phases connected like a triangle.

Figure 12:
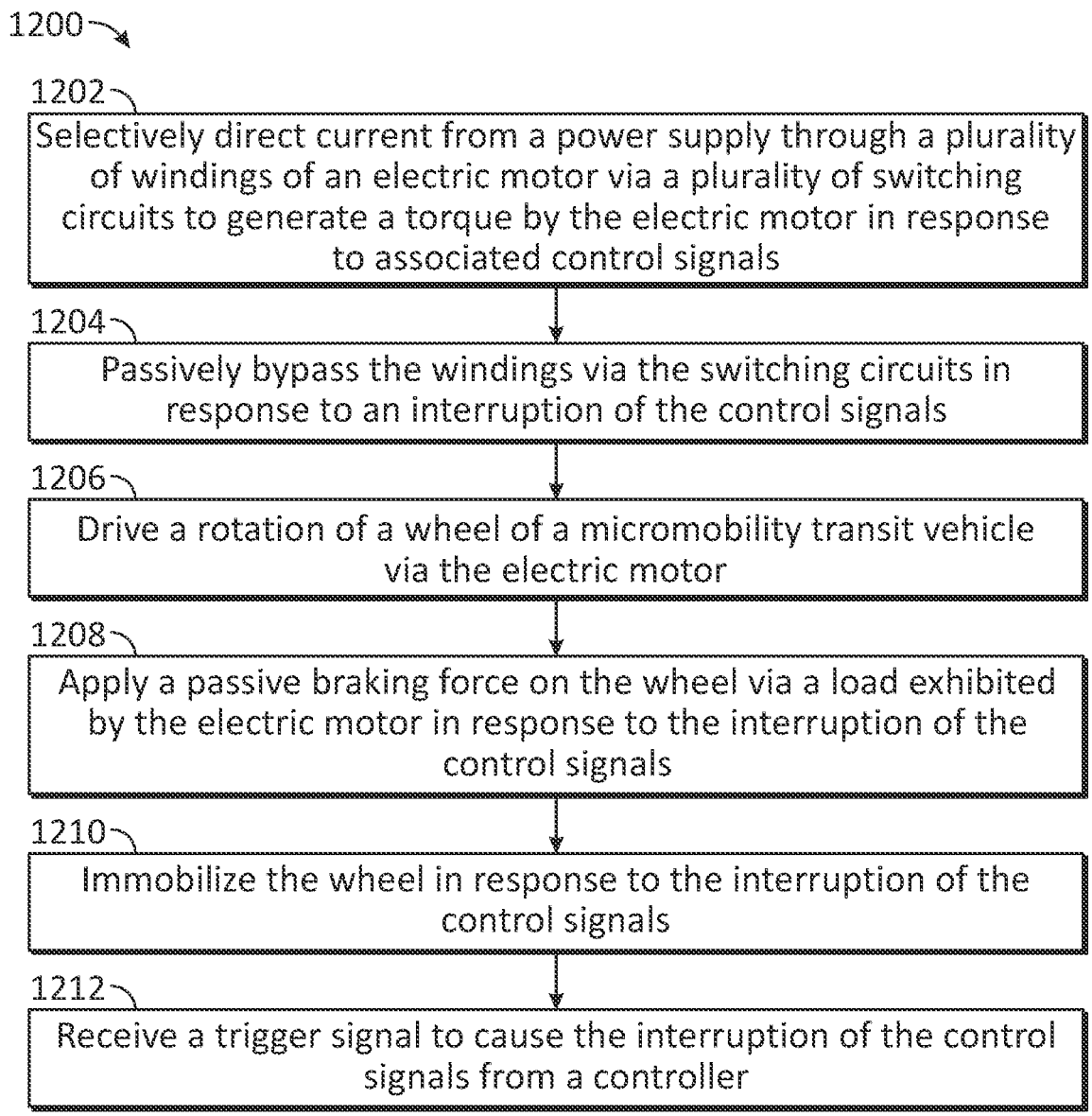
FIG. 12 illustrates a flow diagram of a process of controlling an electric motor of a micromobility transit vehicle, in accordance with an embodiment of the disclosure.

FIG. 12 illustrates a flow diagram of a process 1200 of controlling an electric motor of a micromobility transit vehicle, in accordance with an embodiment of the disclosure. It should be appreciated that any step, sub-step, sub-process, or block of process 1200 may be performed in an order or arrangement different from the embodiments illustrated by FIG. 12. For example, one or more blocks may be omitted from or added to the process 1200. Although process 1200 is described with reference to the embodiments of FIGS. 1-11, process 1200 may be applied to other embodiments.

The micromobility transit vehicle and electric motor associated with process may be similar to micromobility transit vehicle 600 and electric motor 634 described above. For example, micromobility transit vehicle may be an electric bike or scooter. In addition, electric motor may include a stator and a rotor, with the stator coupled to an axle securing a wheel to a frame of micromobility transit vehicle and the rotor coupled to or defining at least a portion of a hub of the wheel to rotate the wheel.

In block 1202, process 1200 may include selectively directing current from a power supply through a plurality of windings of electric motor via a plurality of switching circuits to generate a torque by the electric motor in response to associated control signals. Depending on the application, the torque generated by the electric motor may drive a rotation of a wheel (e.g., a rear wheel) of micromobility transit vehicle. The power supply may be a battery of micromobility transit vehicle (e.g., battery). The switching circuits may be similar to switching circuits, described above. For example, the switching circuits may include P-type MOSFETs coupled to the phases of the electric motor and configured to be turned "OFF" in response to control signals (e.g., voltage) provided at the gate nodes, such as via a controller connected to the power supply. When the P-type MOSFETs are turned "OFF" (via voltage provided at the gate nodes), current may pass through the windings of electric motor to generate a torque of electric motor.

In block 1204, process 1200 may include passively bypassing the windings via the switching circuits in response to an interruption of the control signals. For example, each P-type MOSFET may be configured to be "normally-closed" to conduct when voltage at the gate node is zero, such that the windings of electric motor are shorted in response to interruption of the control signals provided at the gate node, as described above. In embodiments, depletion of the power supply (e.g., battery) may result in the interruption of the control signals.

In block 1206, process 1200 may include driving a rotation of a wheel of the micromobility transit vehicle via the electric motor. For example, the electric motor may be coupled to a rear wheel of micromobility transit vehicle, such as defining at least a portion of the hub of rear wheel, as described above. In such embodiments, operation of electric motor may rotate the rear wheel to propel the micromobility transit vehicle across a surface.

In block 1208, process 1200 may include applying a passive braking force on the wheel via a load exhibited by the electric motor in response to the interruption of the control signals. For example, due to the nature of the physical operation of the shorted motor, micromobility transit vehicle may be slowed down in a gradual and safe manner (e.g., instead of applying an immediate full force remote braking operation). In particular, the shorted windings may limit the motor's circuitry from passing currents induced by changes in magnetic fields in response to rotation of magnets of the electric motor.

In block 1210, process 1200 may include immobilizing the micromobility transit vehicle in response to the interruption of the control signals. For instance, due to the nature of the physical operation of the shorted motor, when external forces are applied to rotate the electric motor (e.g., by a rider pedaling), the overall external force required to rotate the electric motor may increase dramatically which will counteract the rider's further pedaling and thus limit or prevent movement of the micromobility transit vehicle.

In block 1212, process 1200 may include receiving, by a controller, a trigger signal to cause the interruption of the control signals from the controller. Depending on the application, the trigger signal may be received by the controller from a remote system (e.g., a remote network or external device). The trigger signal may be sent to controller based on a detected condition of micromobility transit vehicle. For example, the trigger signal may be sent based on a detected theft or vandalism to micromobility transit vehicle (e.g., as determined from data from one or more sensors, GPS modules, or other modules of micromobility transit vehicle). In embodiments, the trigger signal may be sent when a detected speed of micromobility transit vehicle is excessive (e.g., based on conditions or terrain), above a threshold (e.g., exceeding a speed limit), or otherwise unsafe (e.g., based on age or experience of rider).

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

All relative and directional references (including upper, lower, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. It should also be understood that numerous modifications and variations are possible in accordance with the principles of the present disclosure. The following claims are intended to cover all generic and specific features described herein, as well as all statements of the scope of the present method and system, which, as a matter of language, might be said to fall there between.

What is claimed is:

1. A micromobility transit vehicle comprising:
an electric motor configured to drive a rotation of a wheel and comprising:
a plurality of windings, and
a plurality of switching circuits configured to selectively direct current from a power supply through the windings to generate a torque by the electric motor to drive the rotation of the wheel in response to associated control signals, wherein the switching circuits are configured to passively bypass the windings in response to an interruption of the control signals.

2. The micromobility transit vehicle of claim 1, wherein: the power supply is a battery; and
depletion of the battery results in the interruption of the control signals to cause the electric motor to create a load on the wheel.

3. The micromobility transit vehicle of claim 1, wherein the interruption of the control signals causes the electric motor to exhibit a load on the wheel resulting in a passive braking force applied on the wheel, wherein the passive braking force comprises a regenerative braking force.

4. The micromobility transit vehicle of claim 1, wherein the micromobility transit vehicle is configured to be immobilized based on the control signals.

5. The micromobility transit vehicle of claim 1, further comprising a controller configured to receive a wireless trigger signal from a remote system to cause the interruption of the control signals.

6. The micromobility transit vehicle of claim 5, wherein: the controller is powered by a battery; and
depletion of the battery results in the interruption of the control signals from the controller.

7. The micromobility transit vehicle of claim 1, further comprising a housing around the plurality of switching circuits to limit tampering of the switching circuits.

8. The micromobility transit vehicle of claim 1, wherein the interruption of the control signals locks the wheel from moving.

9. The micromobility transit vehicle of claim 1, wherein:
the electric motor further comprises a stator and a rotor;
the stator is coupled to an axle configured to secure the wheel to a frame of the micromobility transit vehicle; and
the rotor is coupled to or defines at least a portion of a hub of the wheel to rotate the wheel.

10. A method of controlling an electric motor of a micromobility transit vehicle, the method comprising:
selectively directing current from a power supply through a plurality of windings of the electric motor via a plurality of switching circuits to generate a torque by the electric motor to drive a rotation of a wheel of the micromobility transit vehicle in response to associated control signals; and
passively bypassing the windings via the switching circuits in response to an interruption of the control signals.

11. The method of claim 10, wherein: the power supply is a battery; and depletion of the battery results in the interruption of the control signals to cause the electric motor to create a load on the wheel.

12. The method of claim 11, further comprising applying a passive braking force on the wheel via a load exhibited by the electric motor in response to the interruption of the control signals.

13. The method of claim 11, further comprising immobilizing the micromobility transit vehicle in response to the interruption of the control signals.

14. The method of claim 11, further comprising receiving, by a controller, a trigger signal to cause the interruption of the control signals from the controller.

15. The method of claim 14, wherein the receiving comprises receiving a wireless trigger signal from a remote system.

16. The method of claim 15, wherein:
the controller is powered by a battery; and
depletion of the battery results in the interruption of the control signals from the controller.

17. The method of claim 11, wherein the switching circuits are positioned within a housing to limit tampering of the switching circuits.

18. The method of claim 11, further comprising driving a rotation of a wheel of the micromobility transit vehicle via the electric motor.

19. The method of claim 11, wherein: the micromobility transit vehicle is an electric bike or scooter; the electric motor further comprises a stator and a rotor; the stator is coupled to an axle securing the wheel to a frame of the micromobility transit vehicle; the rotor is coupled to or defines at least a portion of a hub of the wheel to rotate the wheel; and the interruption of the control signals locks the wheel from moving.

20. A micromobility transit vehicle comprising:
a wheel;
a battery; and
an electric motor defining a hub of the wheel and configured to drive a rotation of the wheel, the electric motor comprising:
a plurality of windings; and
a plurality of switching circuits configured to selectively direct current from the battery through the windings to generate a torque by the electric motor to drive the rotation of the wheel in response to associated control signals, wherein the switching circuits are configured to passively bypass the windings in response to an interruption of the control signals.

\* \* \* \* \*